UNIVERSAL MULTIPLE ACCESS TELEPHONE TERMINAL

Filed Oct. 28, 1965

INVENTOR

MARIO LILLA

BY Joseph A. Hill

ATTORNEY

INVENTOR
MARIO LILLA
BY Joseph A. Hill
ATTORNEY

INVENTOR
MARIO LILLA
BY Joseph A. Hill
ATTORNEY

INVENTOR
MARIO LILLA
BY Joseph A. Hill
ATTORNEY

United States Patent Office 3,419,685

Patented Dec. 31, 1968

3,419,685
UNIVERSAL MULTIPLE ACCESS TELEPHONE TERMINAL

Mario Lilla, Kenosha, Wis.
(4401 Lee Highway, Apt. 27, Arlington, Va. 22207)

Filed Oct. 28, 1965, Ser. No. 505,577
1 Claim. (Cl. 179—99)

ABSTRACT OF THE DISCLOSURE

The present invention relates to a telephone adapter unit for increasing the line capacity of a standard six button, five line telephone set.

The invention described herein may be manufactured and used by or for the Government for governmental purposes without the payment to me of any royalty thereon.

This invention relates to a telephone adapter unit. Specifically the invention pertains to a unique transfer bank arrangement whereby a standard six button telephone set is converted from the standard five line capability to eight line capability. The standard six button telephone set is well known in the telephone art.

There have been many recent innovations in the telephone art concerned with increasing the line capacity of business phones. Some include private switchboard arrangements. All of these innovations require complete changes in telephone hardware. This invention improves the line capacity of the widely used six button telephone sets by means of an adapter unit. With this invention the capability of the standard six button telephone set is improved, and is not rendered obsolete. These advantages are realized without physically altering the telephone set.

Accordingly, the object of this invention is to provide an adapter unit which directly connects with the standard telephone set thereby increasing the line capacity.

Another object of this invention is to provide an adapter unit having an upper and lower bank arrangement with means to shift between the upper and lower banks thereby increasing line capacity.

Figures 1, 2:
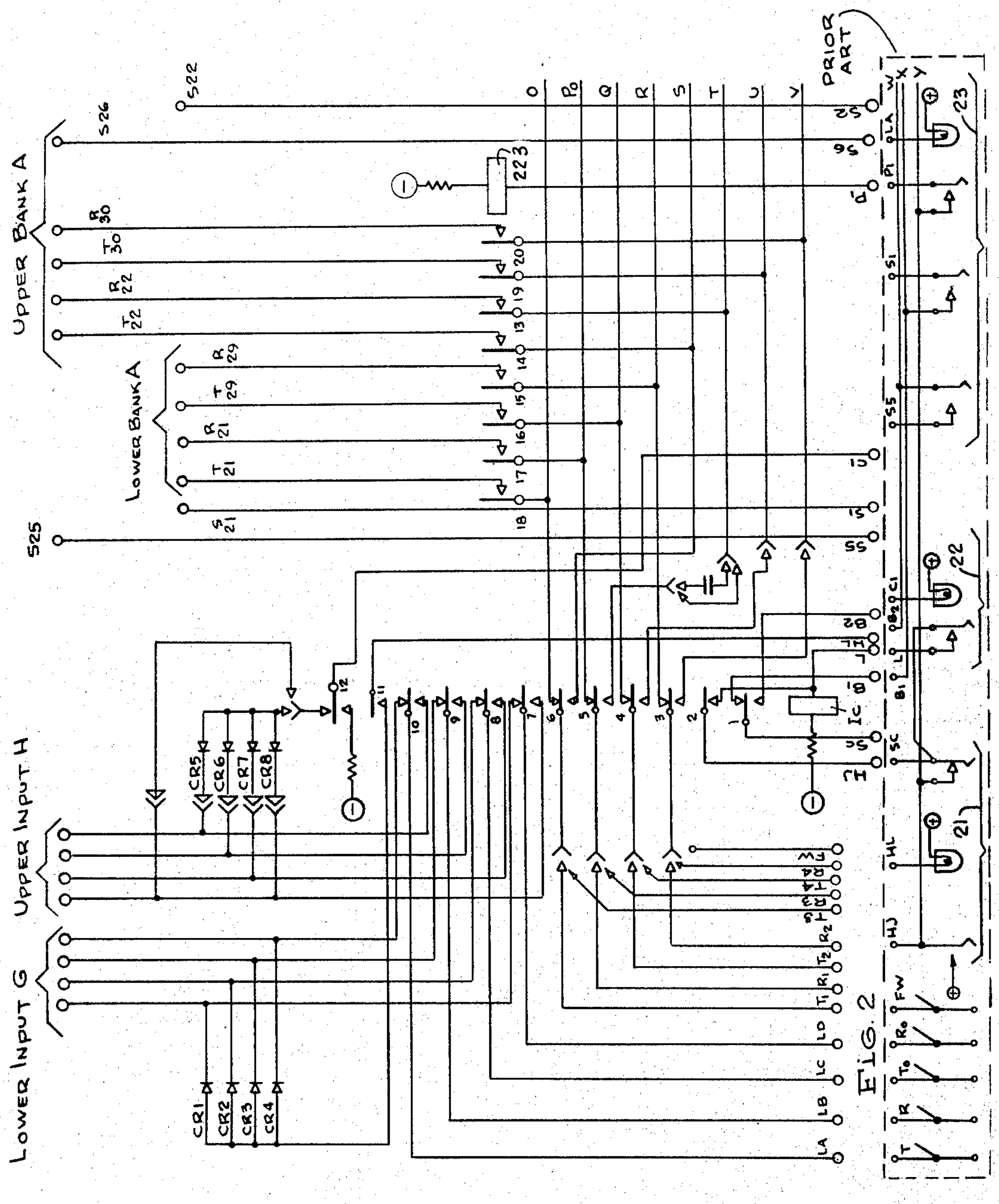
Figures 1A, 2A:
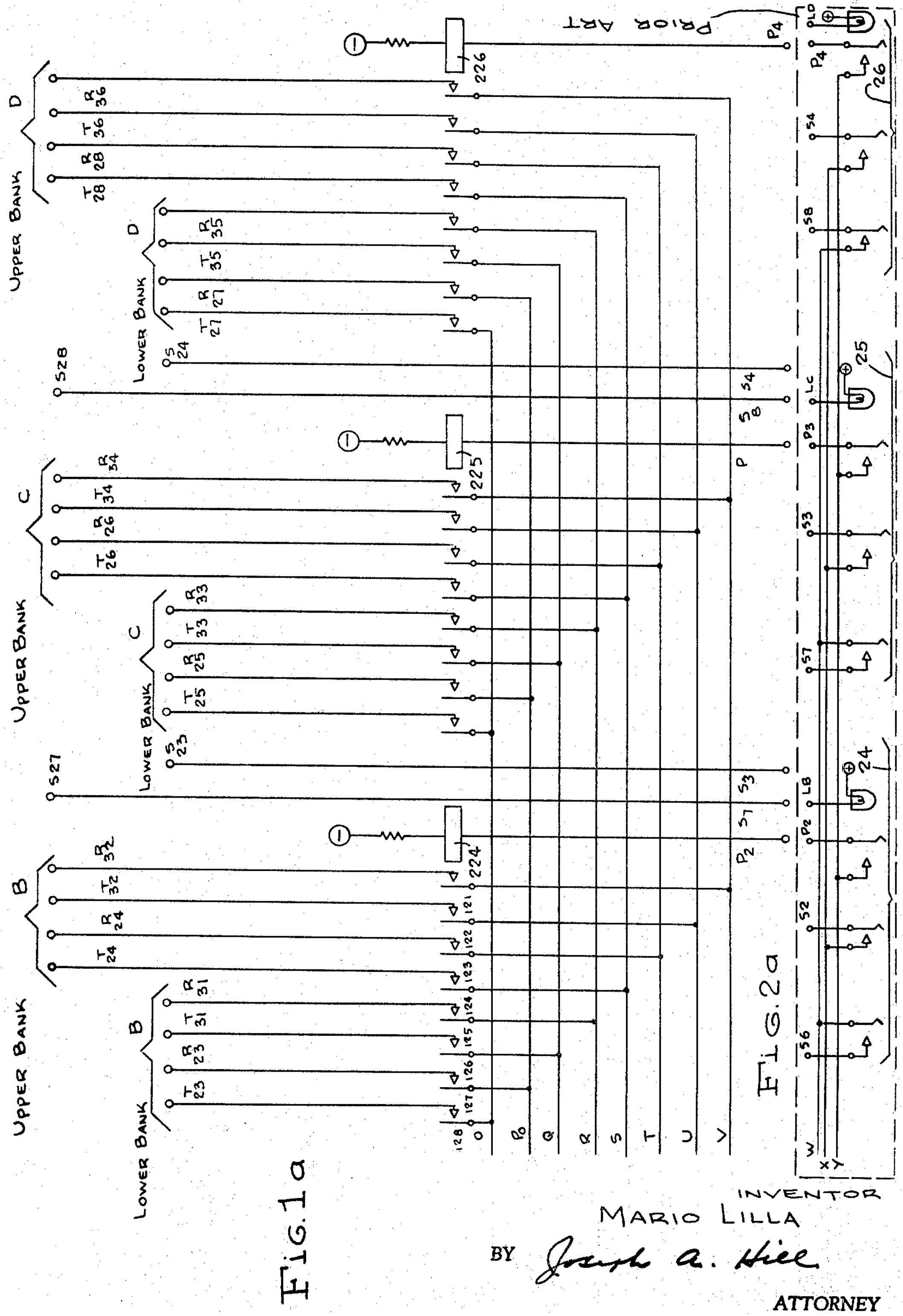
Figure 3:
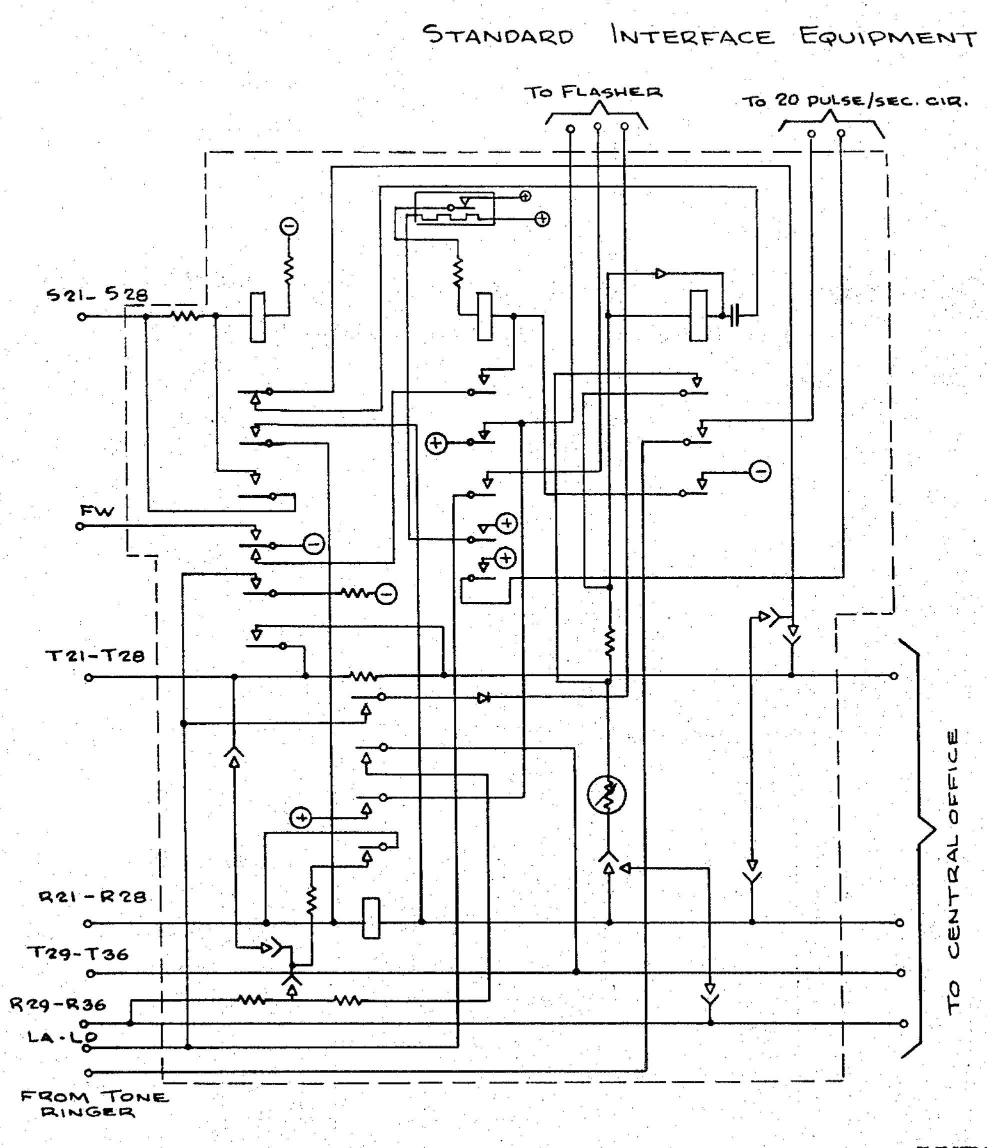
Figure 4:
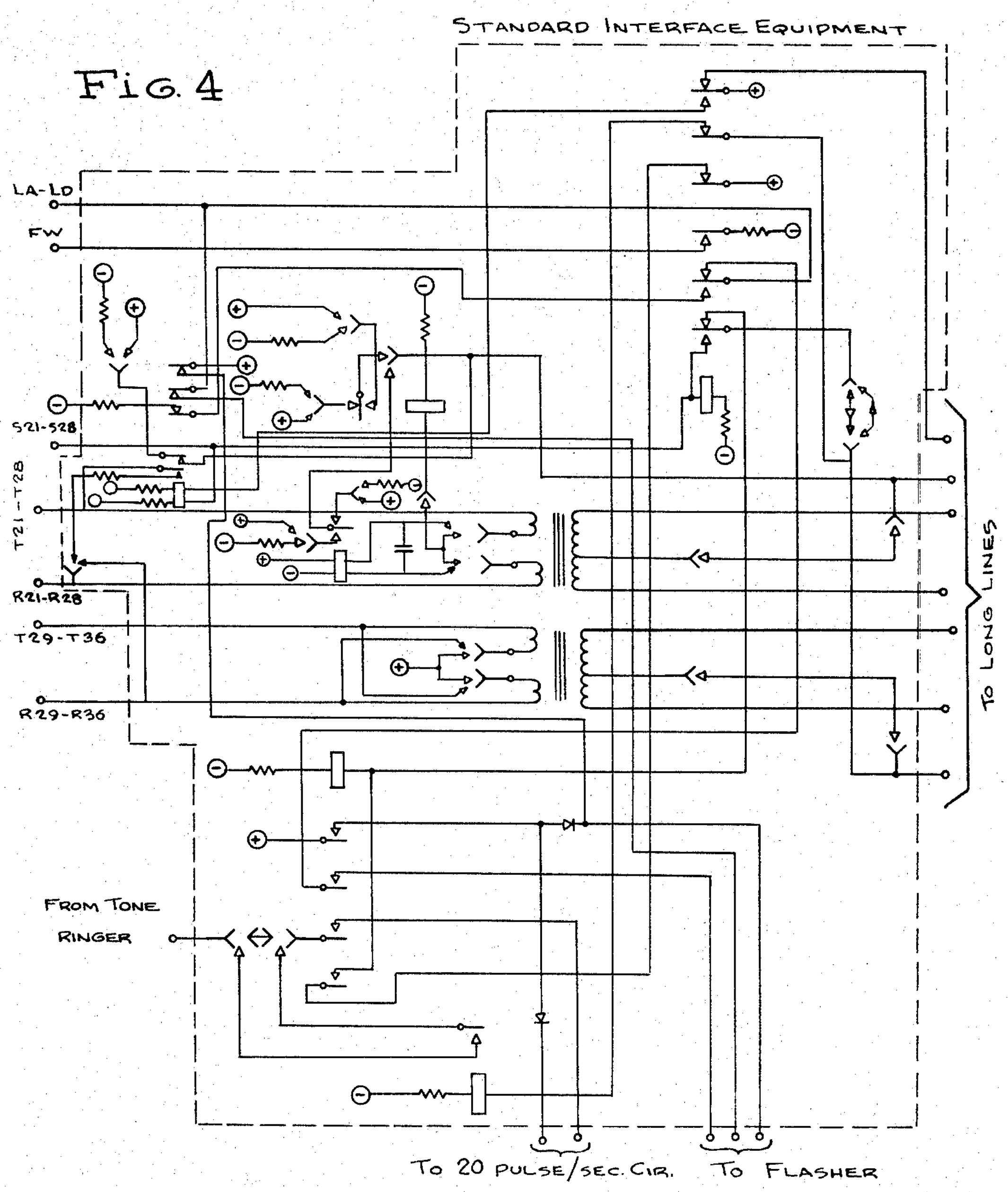

These and other objects will become apparent by reference to the following description taken in conjunction with the accompanying drawings, in which:

FIG. 1 shows a portion of the circuitry involved in the adapter unit which is allied with three of the six buttons of the telephone set;

FIG. 1*a* shows a portion of the circuitry involved in the adapter unit which is allied with the remaining three of the six buttons of the set;

FIG. 2 shows the standard circuitry of three of the six buttons of the telephone set;

FIG. 2*a* shows the standard circuitry of the remaining three of the buttons;

FIG. 3 is a first interface unit which can be used between the adapter unit and the central exchange office; and FIG. 4 is a second interface which can be used interchangeably with the first interface unit. This interface connects the adapter unit to long lines facilities of commercial equipment.

Before explaining in detail the operation of this invention, a brief description of the details of the drawings is necessary.

FIGS. 2 and 2*a* whch are joined at points W, X and Y depict the circuitry of one standard six button telephone set. FIG. 2 shows the first three telephone buttons numbered 21, 22 and 23 while FIG. 2*a* shows the second three telephone buttons numbered 24, 25 and 26. Novelty is not claimed in the telephone set of FIGS. 2 and 2*a* standing alone. The adapter unit of FIG. 1 and FIG. 1*a* comprises the essence of this invention. FIG. 1 and FIG. 1*a* are joined at points O, P*o*, Q, R, S, T, U and V. The upper and lower banks A, B, C and D whose terminations are denoted by the alphabetical letters T and R along with numerical subscripts, are connected to corresponding terminals on the interface units of FIG. 3 and FIG. 4. These two interface units can be used interchangeably. They comprise conventional circuitry with modifications designed to make this system compatible with already existing systems. Accordingly, novelty is not claimed in the interface units of FIG. 3 and FIG. 4 standing alone. The inputs to FIG. 3 and FIG. 4 correspond to their exact counterparts which are found in FIG. 1 and FIG. 1*a*. FIG. 3 and FIG. 4 show a series of wires leading to a 20 pulse per second audible ringing circuit and to a flasher. The flasher is of conventional design. The ringing circuit, however, uses an oscillator arrangement which is used to provide the 20 pulses per second audible ring.

This system provides a unique circuit layout for FIGS. 1, 1*a*, 3 and 4. FIGS. 1 and 1*a* are designed so that they may be placed upon a printed circuit card. The same holds true for FIG. 3 and FIG. 4 each of which is also placed upon a printed circuit card. This feature provides maximum flexibility by allowing one to install or interchange the circuit cards with a minimum of effort and skill. These circuit cards may be placed anywhere between the telephone set and the long lines or the central office exchange. Normally the circuit card containing FIGS. 1 and 1*a* are placed in close proximity to the telephone set.

The adapter unit includes upper bank and lower bank traffic leads which feed conventional interface equipment modified to be compatible with this adapter unit, as shown in FIG. 3 and FIG. 4. This is shown in FIGS. 1 and 1*a* and marked A, B, C and D. The means for switching between the upper bank and lower bank traffic routes are found in contacts 1 through 6 actuated by solenoid 1C. The energy used to signal the presence of incoming calls is routed over either the upper bank signal input H or the lower bank signal input G in FIG. 1. These lower and upper input signal leads are connected to conventional interface equipment modified to be compatible with this adapter unit. Such equipment is shown in FIGS. 3 and 4. The means for switching between these upper and lower banks for incoming signalling energy is found in relay contacts 7–12 actuated by solenoid 1C of FIG. 1.

The leads which energize the lights of the telephone set are marked LA, LB, LC and LD. These leads feed their associated telephone set button lights identically marked in FIG. 2. All traffic is handled through the traffic leads of FIG. 1, marked $T_1$, $R_1$, $T_2$, $R_2$ and $T_3$, $R_3$, $T_4$, $R_4$. These leads feed their associated telephone set traffic leads marked T, R, T*o*, R*o*. The set marked $T_1$, $R_1$, $T_2$, $R_2$ is used with a simplex four-wire telephone while $T_3$, $R_3$, $T_4$, $R_4$ leads are used with the standard four-wire telephone set.

The contact and lamp within brackets 21 show the standard "Hold" key circuitry. Brackets 22 define the shift key circuitry. The circuitry within brackets 23 to 26 define the conventional line keys. Each of the line keys 23 to 26 are associated with solenoids 223 to 226. Depressing line key 23 activates solenoid 223 which engages contacts 13 to 20. An identical situation exists for line keys 24 to 26 and their associated solenoids 224 to 226.

A unique feature of this invention involves the use of the shift key to transfer from the lower bank to the upper bank. While conventional six button telephone sets provide five-line service, by use of the adapter unit of FIGS. 1 and 1*a* the line capability is increased from five lines to eight lines. This is accomplished through the use of upper banks and lower banks. The upper and lower banks refer to those conductors so marked in FIGS. 1 and 1*a*. Buttons 23 through 26 are allied with upper and lower banks A through D, respectively. When the shift button 22 is not engaged, the lower bank lines are active and in a position to handle traffic. Depressing the shift button 22 transfers the operation from the lower bank to the upper bank. Buttons 23 through 26 are now engaged in the upper bank. Traffic now is handled by the upper bank. Thus the line capability of the standard six-button telephone set is increased from five to eight lines.

FIGS. 1 and 1*a* show the circuit arrangement for the situation which has the lower bank engaged. In this situation the lower banks A through D are the outputs of this novel adapter unit which feeds conventional interface units, FIG. 3 or FIG. 4. To shift to the upper bank mode of operation, the shift key 22 of FIG. 1 is depressed. This activates solenoid 1C of FIG. 1. The contact points 1 through 12 actuated by solenoid 1C fall, thereby engaging the upper bank mode. Now upper banks A through D are in condition to handle the telephone traffic. To restore the operation back to the lower bank mode one only need hang up the telephone receiver. This releases the solenoid 1C of FIG. 1 thereby transferring the contact points 1–12 back to the lower bank mode.

In this system the hold key 21 of FIG. 1*a* provides all the functions of any conventional hold key. A party can be engaged in conversation in the upper bank and at the same time receive a call in the lower bank. The upper bank line can be held by merely engaging the hold button, thus freeing the telephone user to accept the lower case call by transferring to the lower bank.

Incoming lower bank calls will cause one of the four line buttons 23 through 26 to flash, in the same manner as conventional signalling. If the incoming call is directed to one of the upper bank lines the shift button 22 will flash. Then by depressing the shift key 22, the flashing is transferred to that line button which defines the line engaged. The exact upper bank line engaged is thereby determined. This is accomplished by use of the unique diode arrangement involving diodes CR1 through CR8 of FIG. 1. An upper case incoming call signal (of negative potential) appears at the upper case leads at point H of FIG. 1. This signal then travels through diodes CR5, 6, 7 and 8 through contact 12, actuated by solenoid 1C, to the shift key 22 of FIG. 2. The incoming call signal causes the shift key to flash. Depressing the shift key activates solenoid 1C which drops contact points 1 through 12. The lamps of line buttons 23 through 26 are now transferred via contact points 6 through 10. The upper bank incoming signal call leads at point H are thereby dedicated to line buttons 23 through 26. Thus by depressing the shift key one is able to determine which upper bank line is involved in the incoming upper bank call.

An upper bank incoming call signal when routed to flash the line buttons may engage a line button which already is glowing due to its counterpart lower bank line being busy. For example, suppose line button 23 is in a steady glow state because the user of the telephone is engaged in conversation over the lower bank line. An incoming upper bank call when shifted to flash the line buttons would normally flash line button 23. To provide means for signalling the user of the telephone engaging the lower bank line this system powers the steady glowing lamp which shows a busy signal with 15 volts, while the flashing lamp which shows incoming calls with 20 volts. Thus the incoming upper bank signal would prevail over the steady glow of the busy lower bank line thereby causing a flashing of the associated line button lamp.

I claim:

1. An adapter for increasing line capacity between a telephone and interface equipment, said telephone having traffic leads, light button leads and shift button leads, said adapter comprising:

(a) a plurality of lower bank traffic leads connected to said telephone and said interface equipment for carrying telephone traffic;

(b) a plurality of upper bank traffic leads connected to said telephone and said interface equipment for carrying telephone traffic;

(c) a first switching means connected to said upper bank traffic leads and said lower bank traffic leads;

(d) means connecting said telephone set to said first switching means;

(e) a plurality of upper bank signal lines connected to said interface equipment;

(f) a plurality of lower bank signal lines connected to said interface equipment;

(g) a second switching means connected to said upper bank signal leads and said lower bank signal leads;

(h) means connecting the telephone light button leads to said second switching means; and (i) third switching means for establishing a connection between said upper bank traffic leads and said telephone shift button leads when said second switching means electrically contacts said lower bank signal leads, said third switching means including diode means and a relay connected in series therewith, said relay activated by engagement of the shift button.

References Cited

UNITED STATES PATENTS 3,101,393 8/1963 Desnoes et al. -------- 179—27

KATHLEEN H. CLAFFY, *Primary Examiner.*

A. McGILL, *Assistant Examiner.*